United States Patent
Harlin et al.

(10) Patent No.: US 6,827,568 B2
(45) Date of Patent: Dec. 7, 2004

(54) ARRANGEMENT IN CONNECTION WITH CLAMPING TOOLS

(75) Inventors: Ali Harlin, Vantaa (FI); Jyrki Pennala, Vantaa (FI); Pekka Huotari, Kotalahti (FI)

(73) Assignee: Maillefer S.A., Ecublens (CH)

( * ) Notice: Subject to any disclaimer, the term of this patent is extended or adjusted under 35 U.S.C. 154(b) by 202 days.

(21) Appl. No.: 10/220,569

(22) PCT Filed: Mar. 26, 2001

(86) PCT No.: PCT/FI01/00294

§ 371 (c)(1),
(2), (4) Date: Nov. 29, 2002

(87) PCT Pub. No.: WO01/72497

PCT Pub. Date: Oct. 4, 2001

(65) Prior Publication Data

US 2003/0143296 A1 Jul. 31, 2003

(30) Foreign Application Priority Data

Mar. 28, 2000 (FI) .............................................. 20000711

(51) Int. Cl.[7] .............................................. B29C 47/06
(52) U.S. Cl. ................... 425/113; 425/133.1; 425/190; 118/125
(58) Field of Search ................................ 118/118, 125, 118/405, 410; 425/190, 192 R, 133.1, 113

(56) References Cited

U.S. PATENT DOCUMENTS

| | | | |
|---|---|---|---|
| 3,820,927 A | 6/1974 | Toomajanian | |
| 4,149,839 A | * 4/1979 | Iwawaki et al. | 425/133.1 |
| 4,472,129 A | 9/1984 | Siard | |
| 4,525,131 A | 6/1985 | Hauser, Jr. | |
| 4,798,526 A | 1/1989 | Briggs et al. | |
| 5,069,612 A | 12/1991 | Teutsch et al. | |
| 5,773,037 A | 6/1998 | Geider et al. | |
| 5,824,369 A | * 10/1998 | Li et al. | 118/410 |

FOREIGN PATENT DOCUMENTS

EP  0 513 616 A1  11/1992

* cited by examiner

*Primary Examiner*—Tim Heitbrink
(74) *Attorney, Agent, or Firm*—Oliff & Berridge, PLC

(57) ABSTRACT

An arrangement in connection with clamping tools, which comprises a nozzle structure which consists of coaxially arranged nozzle elements and is arranged to form one or more layers which cover a flexible elongated element on the surface of the flexible elongated element, which passes through the innermost nozzle element, in which arrangement at least the head of the nozzle element, which controls the flexible elongated element, is a separate unit which is arranged to be pushed into its position in the direction of the flexible elongated element and provided with gripping means, which grip the innermost nozzle element of the nozzle structure as the unit arrives at the nozzle element. The joint between the separate unit and the nozzle element of the nozzle structure is arranged to be loosened by repulsive force acting on the separate unit in the direction of the flexible elongated element and the separate unit is arranged to exit from the nozzle structure in the direction of the flexible elongated element.

11 Claims, 1 Drawing Sheet

ARRANGEMENT IN CONNECTION WITH CLAMPING TOOLS

The invention relates to an arrangement in connection with clamping tools, which comprises a nozzle structure which consists of coaxially arranged nozzle elements and is arranged to form one or more layers covering a flexible elongated element on the surface of the flexible elongated element, which passes through the innermost nozzle element, in which arrangement at least the head section of the innermost nozzle, which controls the flexible elongated element, is a separate unit, which is arranged to be pushed into its position in the direction of the flexible elongated element and provided with gripping means, which grip the innermost nozzle element of the nozzle structure as the unit arrives at the nozzle element.

The above-mentioned arrangements have been known for a long time e.g. from the art related to cable manufacture. Solutions known from U.S. Pat. Nos. 3,820,927, 4,472,129 and 4,798,526 can be mentioned as examples of prior art.

A disadvantage related to the prior art solutions is that the nozzle structure needs to be altered e.g. when the cable type to be manufactured changes. In prior art solutions the nozzle structure often needs to be disassembled and then naturally re-assembled before the manufacturing process can continue. The production line is thus stopped during the whole duration of the changing operation, which also decreases productive work time on the line and increases the costs.

The object of the invention is to provide an arrangement which eliminates the disadvantages of the prior art. This is achieved with the arrangement according to the invention. The arrangement according to the invention is characterized in that the joint between the separate unit and the nozzle element of the nozzle structure is arranged to be loosened by repulsive force acting on the unit in the direction of the flexible elongated element and that the separate element is arranged to exit the nozzle structure in the direction of the flexible elongated element.

A major advantage achieved by the arrangement of the invention is that the productive work time increases considerably in connection with changing of the cable type to be manufactured. For example, compared to the productive work time of a prior art CV line, quick change of the cable type to be manufactured achieved by the invention increases the work time by 10 to 20%. The arrangement according to the invention also eliminates problems related to reflux of plastic material when the nozzle structure is altered. The above-mentioned reflux of plastic material has caused problems in prior art solutions because the nozzle is changed at the same time with the cable type from behind, and thus a space is left between the cable and the nozzle material, which enables reflux of plastic material. The flux is caused by pressure in the CV tube.

Figure 1:
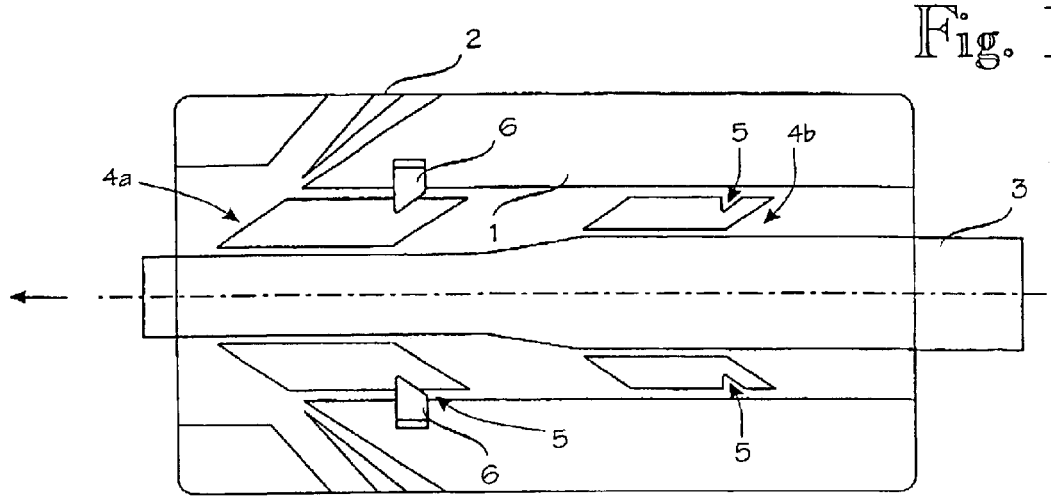
Figure 2:
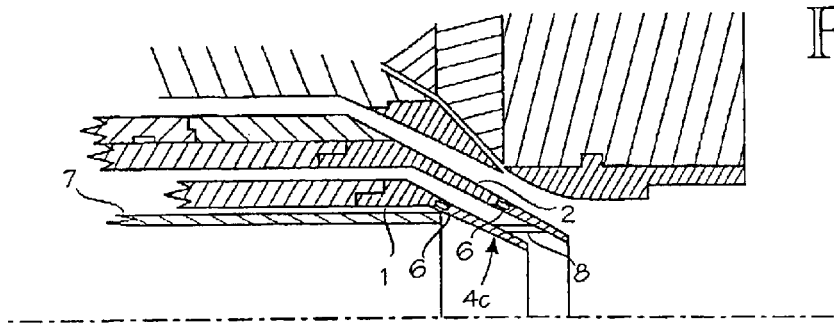
Figure 3:
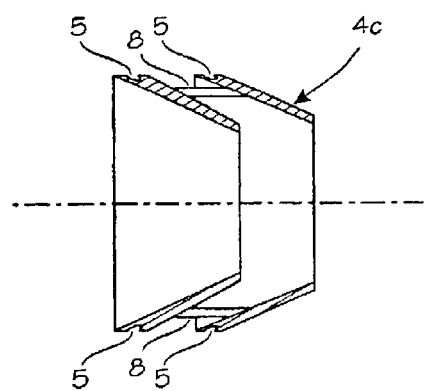
Figure 4:
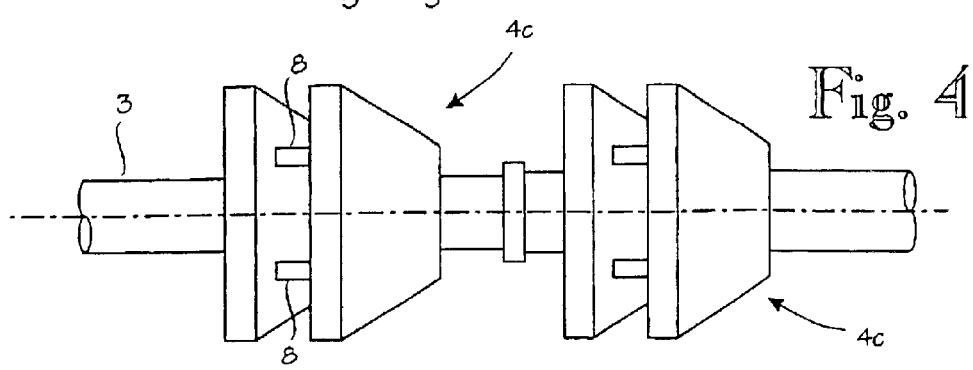

In the following, the invention will be described in greater detail by means of preferred embodiments illustrated in the accompanying drawings, in which FIG. 1 schematically illustrates the basic principle of the arrangement according to the invention, FIG. 2 schematically illustrates another embodiment of the invention, FIG. 3 schematically illustrates a detail of the embodiment shown in FIG. 2, and FIG. 4 schematically illustrates the basic principle of the use of the arrangement according to the invention.

FIG. 1 schematically illustrates a clamping tool, which comprises a nozzle structure consisting of coaxially arranged nozzle elements 1, 2, the structure being arranged to form one or more layers covering a flexible elongated element 3 on the surface of the flexible elongated element, which passes through the innermost nozzle element 1. The clamping tool 1 shown in FIG. 1 is related to cable manufacture and the flexible elongated element 3 is a cable element 3. The layer or layers to be formed on the cable element are of plastic material, for example.

The above-mentioned issues are fully conventional art to a person skilled in the art, which is why they will not be described in greater detail here. A reference is made to the above-mentioned U.S. Pat. Nos. 3,820,927, 4,472,129 and 4,798,526, in which these issues are described.

According to the basic idea of the invention, at least the head section of the innermost nozzle element 1, which controls the flexible elongated element 3, is a separate unit 4a. The separate unit 4a is arranged to be pushed into its position in the direction of the flexible elongated element 3. The separate unit 4a is also provided with gripping means 5, which grip the innermost nozzle element 1 in the nozzle structure as the unit 4a arrives at the nozzle element 1.

The separate unit is selected according to the cable element to be used. In addition to the separate unit 4a, FIG. 1 also shows another separate unit 4b for the sake of clarity, which is intended for a cable element with a diameter larger than that of the cable element intended for the separate unit 4a.

The gripping means 5 provided in the separate unit 4a, 4b are made of cavities which are arranged to act with counterparts 6 provided in the nozzle element 1. It is clear that gripping of the separate unit on the nozzle element can also be implemented otherwise.

As stated above, the separate unit 4a, 4b is pushed into its position in the direction of the flexible elongated element, which is marked with an arrow in FIG. 1. According to the basic idea of the invention, the joint between the separate unit and the nozzle element of the nozzle structure is arranged to be loosened by repulsive force acting on the separate unit in the direction of the flexible elongated element. The separate unit is removed from the nozzle structure in the direction of the flexible elongated element. The unit 4a, 4b forming the head section of the nozzle element can also be arranged to be carried forward along with the movement of the flexible elongated element 3 so that a new unit loosens the joint provided between the preceding unit and the nozzle elements 1 of the nozzle structure by the gripping means 5.

The above-mentioned idea can be clarified by means of FIG. 1. It can be thought that the separate element 4b, which is carried along with the movement of the flexible elongated element 3, is arranged to subject the separate element 4a to force in connection with change of the cable size, which loosens the joint achieved by means of the gripping means 5 and the separate element starts to move along with the cable, being stuck to the layers provided on the elongated element. The separate element 4b moves forward until it grips the nozzle element 1 by its gripping means 5.

It is clear that the separate unit 4a, 4b can also be pushed into its position in some other manner. For example, a positioning means, which ensures exact placement of the unit 4a, 4b, can be used for positioning the unit. The positioning means can be e.g. a tubular element, by means of which the separate unit 4a, 4b is pushed into its position in the direction of the elongated element 3 so that the unit 4a, 4b grips the nozzle element 1 at the right point. The tubular member may be provided with a limiter, for example, which ensures that the separate unit is positioned exactly in the right place.

A combination of the above-mentioned arrangements or the like can also be used for positioning the separate unit 4a, 4b.

The above-mentioned tubular element used as the positioning means is shown in FIG. 2, which illustrates another preferred embodiment of the invention. The positioning means is denoted by reference numeral 7. In FIG. 2 the same numbers have the same significance as in FIG. 1.

In the embodiment shown in FIG. 2 the basic idea of the invention has been applied as follows: the head section of the innermost nozzle element 1 and at least the head section of the next outermost nozzle element 2 together form a separate unit 4c, which is arranged to grip the nozzle elements 1, 2 as it arrives at the nozzle elements. The heads sections of the nozzle elements can be attached to each other e.g. by suitable flexible supports 8, in which case the head sections form a separate unit. For the sake of clarity, the unit 4c is illustrated separately in FIG. 3.

The separate unit 4c can be attached to the nozzle elements 1, 2 using gripping means provided on the outer circumference of the head sections. The gripping means can be e.g. similar to the means 5 and 6 shown in FIGS. 1, 2 and 3. It is clear that the gripping means can also be implemented otherwise. The advantage of the gripping means shown in FIGS. 1, 2 and 3 is that they seal the joint and thus prevent harmful reflux of plastic material.

The separate unit 4c according to FIG. 3 can be positioned in the same way as described above in connection with the embodiment of FIG. 1, i.e. using a flexible elongated element, a positioning means or both.

FIG. 4 schematically shows a situation in which the size of a cable element, i.e. the flexible elongated element 3, is changed. For the sake of clarity the nozzle elements have been omitted from FIG. 4. A new separate unit 4c is carried to its position by the flexible elongated element 3, in which case the force generated by the new unit 4c acts on the preceding unit 4c and loosens the joint provided by the gripping means, and thus the preceding unit 4c starts to move forward on the line along with the cable and further e.g. to a take-up reel. It should be noted that the unit 4c is so short that it causes no problems at the idler wheel or at the accumulator after the line. The unit 4c can be brought into use again when the cable is cut as the reel is changed, for instance.

As described earlier, a positioning means can also be used during the above-mentioned change. The positioning means can also be a flange, which is attached to an extension and removes the preceding unit and replaces it with a new unit.

The ability of a moving cable of pulling the plastic material in its direction can be utilized in the solution according to the invention. This prevents the material reflux caused by pressure. A dependency can be derived from the pressure and the velocity of movement of the cable, i.e. the flexible elongated element, and thus the problem caused by reflux can be managed. It is also possible to close the channel towards the rear in the separate units, and thus no reflux will occur.

Depending on the application, the separate unit 4a, 4b, 4c can be a circumferential part or a part that can be split. The positioning means can be e.g. a tubular part or a part that can be split, whose halves form a tubular part.

The embodiments of the invention described above do not limit the invention in any way, but the invention can be modified freely within the scope of the claims. Thus it is clear that the embodiment of the invention or its details need not exactly correspond to those illustrated in the figures, but solutions of other kinds are also feasible. The invention can also be implemented e.g. by installing nozzles whose size adapts from a smaller cable diameter to a larger one inside the extrusion head when it is assembled. In other words, FIG. 1 can be interpreted as showing a situation where the units 4a, 4b have been placed inside the extrusion head in advance. The manufacturing program can be planned according to the components installed in the extrusion head, i.e. a thinner type is manufactured first, then a thicker type, etc. In this embodiment one-piece units which have not been split can be used, although use of split units is also feasible. When the cable diameter is changed, the unit used earlier is pressed out and a new unit is pushed into its position. The final outer diameter can be adjusted within certain limits e.g. by controlling production of the clamp without changing the matrix when pipe tools are used.

What is claimed is:

1. An arrangement in connection with clamping tools, which comprises a nozzle structure which comprising coaxially arranged nozzle elements arranged to form one or more layers which cover a flexible elongated element on the surface of the flexible elongated element, said flexible elongated element passing through the innermost nozzle element, in which arrangement at least head of the nozzle element, which controls the flexible elongated element, is a separate unit said separate unit being arranged to be pushed into its position in the direction of the flexible elongated element and provided with gripping means, which grip the innermost nozzle element of the nozzle structure as the separate unit arrives at the nozzle element, and in which arrangement the joint between the separate unit and the nozzle element of the nozzle structure is arranged to be loosened by repulsive force acting on the separate unit in the direction of the flexible elongated element and the separate unit is arranged to exit from the nozzle structure in the direction of the flexible elongated element.

2. An arrangement according to claim 1, wherein the head section of the innermost nozzle element and at least the head section of the next outermost nozzle element form a uniform unit.

3. An arrangement according to claim 2, wherein the head sections of the nozzle elements are combined with flexible supports.

4. An arrangement according to claim 1, wherein the head section of the nozzle element or the unit forming the head sections of the nozzle elements is arranged to be pushed into its position by a positioning means which ensures accurate placement of the unit.

5. An arrangement according to claim 4, wherein repulsive force directed at a new unit to be pushed into its position by the positioning means is so great that it loosens the joint provided by the gripping means between the preceding unit and the nozzle elements of the nozzle structure.

6. An arrangement according to claim 1, wherein the unit forming the head section of the nozzle element or the head sections of the nozzle elements is arranged to be carried forwards along with the movement of the flexible elongated element so that the new unit directs propulsive force at the preceding unit and loosens the preceding unit and the joint provided between the nozzle elements of the nozzle structure by the gripping means.

7. An arrangement according to claim 6, wherein the unit forming the head section of the nozzle element or the head sections of the nozzle elements is arranged to pushed into its position by a positioning means which ensures accurate placement of the unit.

8. An arrangement according to claim 5, wherein the positioning means is a part that can be split.

9. An arrangement according to claim 1, wherein the unit forming the head sections of the nozzle elements is a part that can be split.

10. An arrangement according to claim 1, wherein the unit forming the head sections of the nozzle elements is a circumferential part.

11. An arrangement according to claim 9, wherein units suitable for thinner and thicker flexible elongated elements are placed inside the nozzle structure in advance.

* * * * *